Oct. 13, 1970                N. L. CUNEO D'ORNANO                3,534,205
                           RECTIFIED CURRENT ALTERNATOR
Filed Dec. 16, 1966                                              4 Sheets-Sheet 1
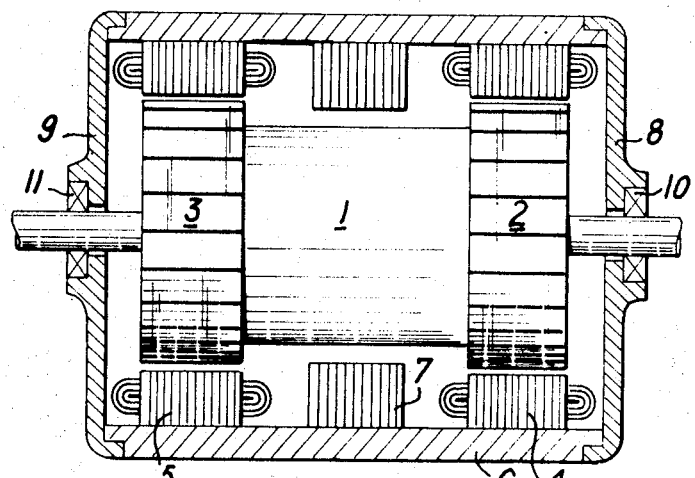
PRIOR ART          FIG.1
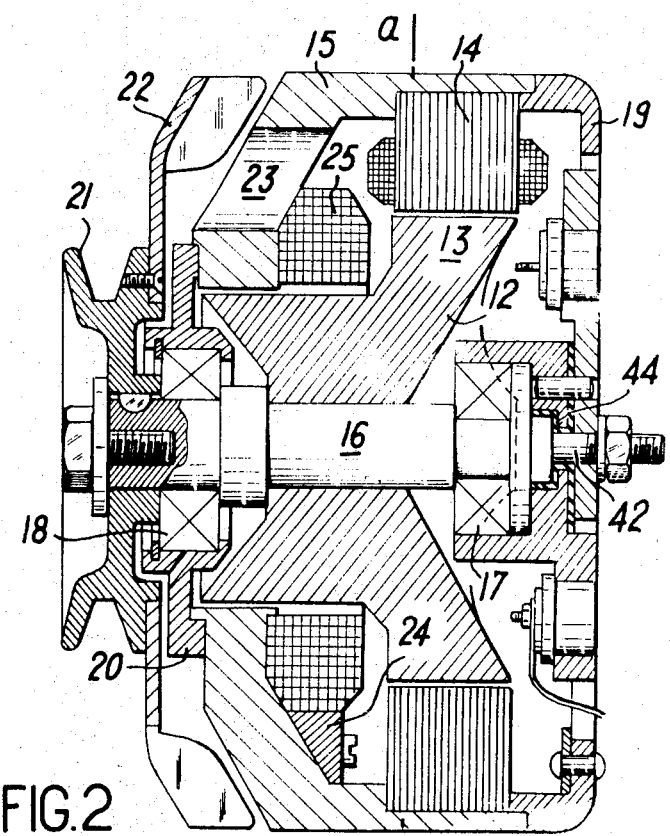
FIG.2
INVENTOR
BY *NAPOLÉON LOUIS CUNEO D'ORNANO*
*Bacon & Thomas* ATTORNEYS Oct. 13, 1970

N. L. CUNEO D'ORNANO 3,534,205

RECTIFIED CURRENT ALTERNATOR

Filed Dec. 16, 1966

INVENTOR

NAPOLÉON LOUIS CUNEO D'ORNANO

BY

Bacon & Thomas

ATTORNEYS

Oct. 13, 1970     N. L. CUNEO D'ORNANO     3,534,205
RECTIFIED CURRENT ALTERNATOR

Filed Dec. 16, 1966     4 Sheets-Sheet 3

INVENTOR
NAPOLÉON LOUIS CUNEO D'ORNANO

BY *Bacon & Thomas*

ATTORNEYS

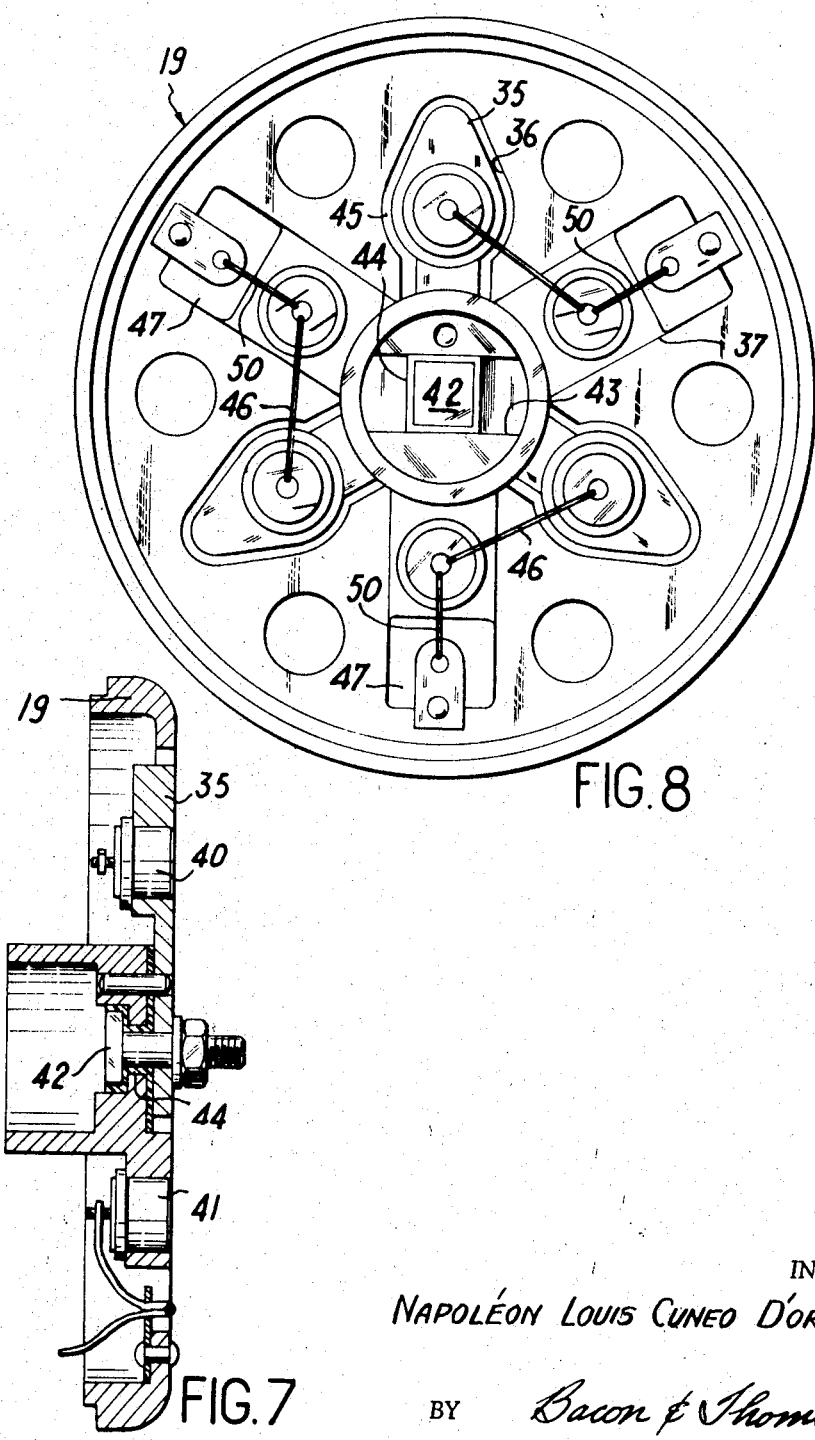

United States Patent Office 3,534,205
Patented Oct. 13, 1970

3,534,205
RECTIFIED CURRENT ALTERNATOR
Napoleon L. Cuneo d'Ornano, 1 Blvd. Exelmans,
Paris, France
Filed Dec. 16, 1966, Ser. No. 602,225
Claims priority, application France, Dec. 22, 1965,
43,263
Int. Cl. H02k 1/14, 31/00
U.S. Cl. 310—178      2 Claims

ABSTRACT OF THE DISCLOSURE

A homopolar alternator having stator teeth made up of 2 stacks of identical laminations each having a tooth portion and two lateral salient portions of unequal length.

---

This invention is concerned with the supply of rectified alternating current, especially to vehicles employed for purposes of transportation either by land, sea or air, and is more particularly directed to a rectified current alternator.

There is a noticeable tendency at the present time, particularly in the automobile industry, to dispense with the direct-current generator units which have hitherto been regarded as standard equipment and to replace these latter by rectified-current alternators. Alternators of the type which are constructed for this purpose are based on two design concepts which differ from the conventional heteropolar alternator.

In the first design concept, the heteropolar alternator comprises a field rotor, the winding of which is supplied by means of a slip-ring and brushes with a low-intensity excitation current which is collected at the terminals of the alternator and controlled by a voltage regulator.

The main disadvantages of this type of alternator are attached to the presence of brushes which give rise to local radio interference as a reuslt of spark generation and which have to be replaced on account of wear.

In the second design concept, the heteropolar alternator comprises a stator winding and a field rotor which is constituted by a permanent magnet. In an arrangement of this type, slip-rings and brushes are no longer employed and the disadvantages attached to alternators of the first type referred-to are in fact removed. However, the second mode of construction entails the presence of a voltage regulator which is more complicated and therefore entails higher capital cost. In point off act, in this second class of alternator, the voltage can be controlled only by limiting the voltages developed across the terminals to a greater or lesser extent according to the speed of the alternators of both types mentioned above are usually of it is no longer possible to produce action on the field rotor.

In addition to their inherent disadvantages, heteropolar alternators of both types mentioned above are usually of substantial size in relation to the characteristics of the current delivered. Furthermore, the dimensional requirements which are laid down for reasons of available space in vehicles in which such alternators are installed make it necessary to construct a stator which has a very small thickness compared with the diameter and which is consequently not conducive to its effective utilization.

In heteropolar alternators which are at present available on the market, the active conductors of the winding which are embedded in the stator slots represents only approximately 30% of the total length of the conductors, whilst the remainder is constituted by connecting loops and is therefore wholly inactive.

Another alternator which is also known is of the so-called homopolar class employed solely in static applications. FIG. 1 of the accompanying drawings shows diagrammatically an alternator of this type which comprises: a field rotor 1 provided at each end with a pole piece 2–3 which is divided into a number of poles corresponding to the frequency of the current to be obtained; two stators 4–5 designed for the production of induced current; a yoke 6 which closes the magnetic circuit between the rotor, the pole pieces of said rotor, and the stators; a stationary field coil 7 surrounding the rotor and designed to excite said rotor; two end-shields 8–9 constituting supports for antifriction bearings 10–11 which carry the rotor shaft.

In a constructional arrangement of this type, the production of current is obtained without either slip-rings or brushes. However, the bulk and weight which result from the need of a double stator exclude the use of an alternator of this type in motor vehicles.

The object of this invention is to overcome the disadvantages of alternators of known types and especially those which have been discussed in the foregoing.

Accordingly, the invention is concerned with an alternator of the homopolar type, said alternator being characterized in that it comprises a rotor having a single pole piece located close to one end whilst the other end of said rotor is cylindrical, and a bell-shaped yoke adapted to carry a stator which is located in oppositely-facing relation to the pole piece of the rotor and adapted to close the magnetic circuit over the cylindrical portion of said rotor.

According to one feature of the invention, the rotor is provided at each end with an axial recess of frusto-conical shape.

According to another feature of the invention, the stator comprises a plurality of unitary teeth which are each formed by a stack of identical laminations, a unitary winding being placed round the core of each tooth.

The invention also extends to the features described hereinafter and to the different possible combinations thereof.

A rectified current alternator in accordance with the invention is illustrated by way of non-limitative example in the accompanying drawings, in which:

FIG. 2 is a front view in cross-section of the alternator in accordance with the invention;

FIGS. 7 and 8 are respectively a cross-sectional view in profile and a rear view of FIG. 6.

Figure 3:
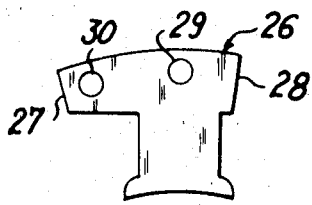
FIGS. 3 and 4 are respectively a front view of one lamination of the type employed to make up the teeth of the stator and a front view of a tooth round which a winding has been placed.

The rectified current alternator according to the invention comprises, as shown in FIGS. 2 to 5, a field rotor 12 of mild steel which is provided with a single pole piece 13, a stator 14 constructed of steel laminations and a bell-shaped yoke 15 of mild steel which closes the magnetic circuit directly over the cylindrical portion of the rotor. The yoke referred to can be formed of either one or a number of parts.

The field rotor 12, the pole piece 13 of which is provided with the number of poles best suited for its intended use (four in the example shown on the drawings) has a generally annular configuration, the lateral faces of which are frusto-conical. As will be explained hereinafter, this arrangement makes it possible to fit some of the members which support the rotor as well as a current rectifier device within the spaces which are thus made available.

It is apparent that, in spite of the recesses formed at the rotor ends, the elements of the magnetic circuit retain a sufficient cross-sectional area to permit the passage of the flux which is necessary for the supply of current to the stator.

The rotor is supported by a shaft 16 which is mounted on two roller bearings 17 and 18; the bearing 17 is carried by an end-shield 19 which is adapted to fit into the yoke 15 and the bearing 18 is carried by a bearing bracket 20, said bracket being fixed on the end of the yoke 15, namely on the end remote from the portion in which the end-shield 19 is fitted.

The alternator is preferably provided, as shown in FIG. 2, with a pulley 21 which is keyed on the shaft 16 and serves to drive the rotor 12 from a power take-off means which is not shown in the drawings, and a ventilating-fan unit 22 which is rigidly fixed to said drive pulley.

The yoke 15 of the alternator which is shown in FIG. 2 is preferably provided with openings 23 in order to permit cooling of the internal volume of the alternator as a result of the rotation of the fan unit 22.

The yoke referred-to is additionally provided with support means 24 for securing and holding a stationary field coil 25.

The stator 14 which is shown in FIG. 2 is constructed by assembling together a plurality of laminations so as to form a tooth, by winding a coil of wire round each tooth and by assembling said teeth in interfitting relation.

To this end, each lamination 26 which forms part of a tooth has the shape which is shown in FIG. 3, that is to say of two asymmetric salient portions formed on each side of a central portion or core element 32. One salient portion 27 has a length which is greater than the other salient portion 28. Each lamination 26 is pierced by two holes, namely a hole 29 formed in the top portion of said lamination and substantially along its longitudinal axis and a hole 30 which is formed in the longest salient portion 27 of said lamination.

Each stator tooth is constituted by two stacks of laminations, namely, one stack in which the salient portions 27 of the laminations are located on the left hand side of the tooth and another stack in which the salient portions 27 are located on the right hand side of said tooth.

Figure 4:
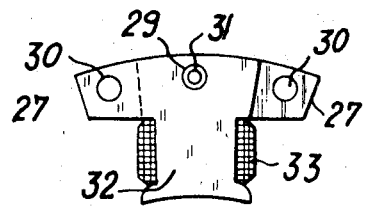

The two stacks of laminations are superposed and interassembled by means of a rivet 31 which is passed through the holes 29 of the laminations. The tooth as thus constituted is provided, as shown in FIG. 4, with a coil 33 which is wound directly on the core 32 of said tooth.

In order to constitute the complete stator assembly 14, the teeth are so disposed that the long sides or salient portions 27 of the stacks of laminations are in superposed relation, said stacks being assembled in this position by means of rivets which are passed through the holes 30.

Figure 5:
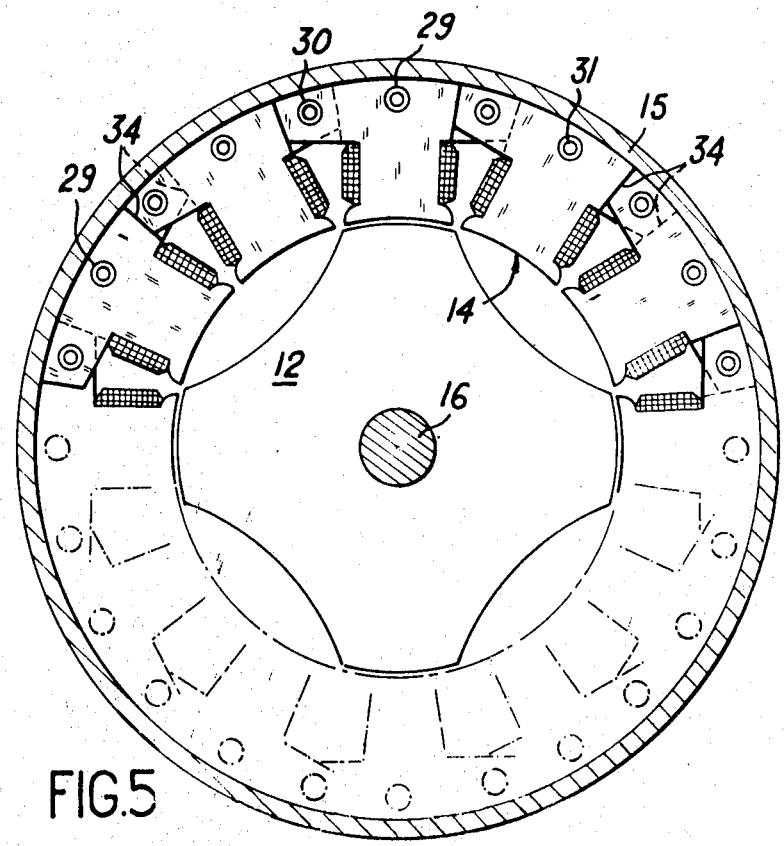
FIG. 5 is a view in transverse cross-section taken along the line $a$—$a$ of FIG. 2, a portion of the stator being shown diagrammatically.

The juxtaposition of the long salient portions 27 of each tooth with the corresponding short salient portions of the adjacent tooth thus forms a multiple scarf joint 34 (as shown in FIG. 5) which closes the magnetic circuit between said teeth.

It is understood that each of the two stacks of laminations which form one tooth has a thickness which is equal to one-half the design thickness of the stator.

By virtue of the structural arrangement of the stator which has been described above, the length of the active conductors of the windings is greater by 35% than the length of the inactive conductors. In consequence, it is possible to construct an alternator which, for equal power and the same diameter, has an overall length which is shorter by 30 to 40% than a corresponding alternator of the heteropolar type which is assigned to the same duty.

Moreover, it is possible in the stator design under consideration to utilize the magnetic orientation of the laminations which results from the rolling of these latter, thereby enhancing the magnetic properties of the stator. In the particular field of aviation, it would also be possible in this form of construction of the stator to utilize laminations having oriented crystals such as, in particular, iron-cobalt alloys.

Figure 6:
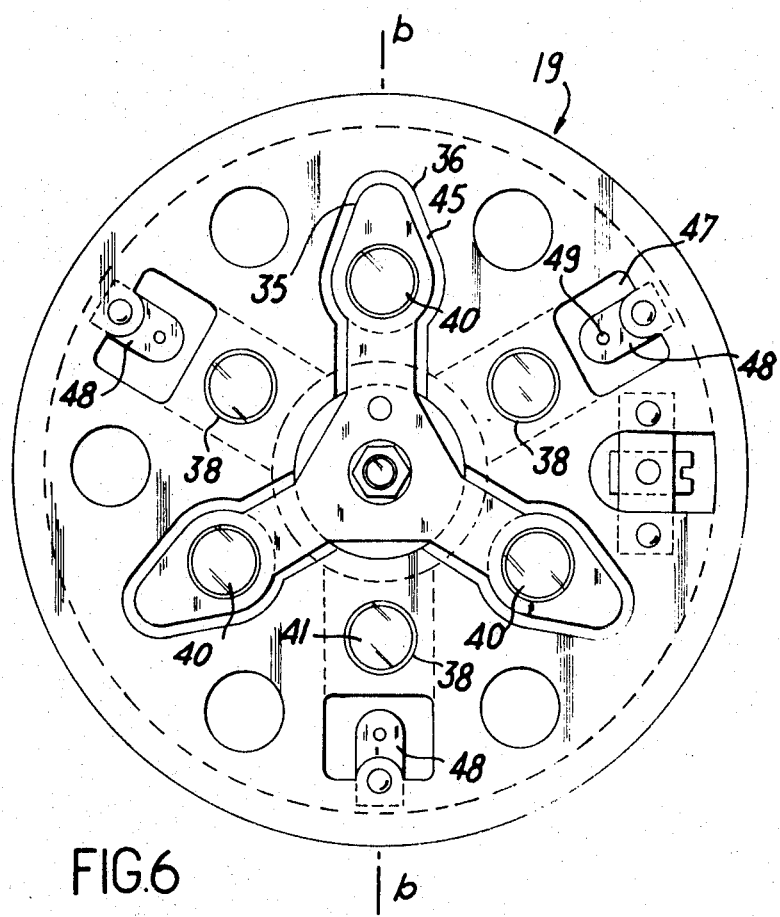
FIG. 6 is a view looking on the end showing the end-shield of the alternator of FIG. 2 and the positioning of the diode-holder element.

The alternator in accordance with the invention preferably comprises a three-phase bridge rectifier which serves to rectify the current delivered by the alternator and which may be of the type shown by way of example in FIGS. 6 to 8 of the accompanying drawings.

The bridge rectifier which is illustrated comprises six diodes arranged as follows:

Three diodes are mounted on an aluminum base 35 having the shape of a three-point star, said base being fitted in a recess 36 of corresponding shape formed in the end-shield 19 of the alternator casing;

The three other diodes are mounted in grooves and recesses respectively designated as 37 and 38 which are formed in the inner face of the end-shield 19.

From FIG. 7, it can be seen that the base 35 is secured to the end-shield 19 by means of a square-headed bolt 42 which permits the mechanical fastening of said base and also serves as a connecting terminal for the supply of current, corresponding to the polarity of said base. There is formed in the bottom of the front face of the end-shield 19 a groove or channel 43 which is intended to accommodate the insulated head of the bolt 42 which is thereby prevented from performing any rotational movement. The bolt 42 as well as the base 35 are insulated from earth by means of a suitable protection element designated by the reference numeral 44 as shown in FIGS. 2, 7 and 8.

The recess 36 is so designed that the edges form with the periphery of the base 35 a free space 45 which is sufficient to permit of cooling of the base.

The ends of the lead-out wires from the six diodes 40 and 41 are welded to the three conductors 46 (as shown in FIG. 8) which couple said diodes electrically in pairs of different polarity. The three conductors 46 are connected to the three corresponding conductors derived from the stator of the alternator. To this end, the end-shield 19 is pierced by three windows 47, on the edges of which are fixed small insulating plates 48 each provided in the central portion thereof with a hole 49 through which are passed the lead-wires 50 corresponding to the conductors 46 as well as the ends of the conductors of each phase which are derived from the alternator proper.

By way of example, an alternator according to the invention in which a voltage of 13.5 volts at 900 r.p.m. and a maximum load of 30 amps at 13.5 volts can be obtained has an overall length of 100 millimeters from the outer face of the drive pulley to the end of the rotor bearing, and has a diameter of 130 millimeters.

For example, in the case of a rotor having four teeth, the alternator delivers current at a frequency of 120 c./s.

The alternator can naturally be designed for higher power ratings, in which case the overall dimensions are modified accordingly.

As is readily apparent, the invention is not limited to the form of construction herein described and illustrated.

It would be possible to have recourse to other modes and other forms of execution without thereby departing either from the scope or the spirit of the invention.

What I claim is:

1. An alternator of the homopolar type comprising:
   a rotor comprising a unitary body having a radially enlarged toothed pole portion at one axial end thereof and a smaller diameter cylindrical portion at its other end, the length of said rotor being short relative to the diameter of said pole portion;

a generally bell-shaped yoke having a stator portion outwardly of said pole portion and an annular cylindrical portion surrounding and closely adjacent said cylindrical portion of said rotor to define therewith a substantially closed magnetic flux path;

means rotatably supporting said rotor relative to said yoke;

said stator portion comprising a plurality of inwardly directed teeth with a winding surrounding each tooth;

each tooth comprising a stack of identical laminations each of which has a tooth portion and two lateral salient portions of unequal lengths;

each tooth of the stator comprising two stacks of superposed laminations, the thickness of each stack being equal to one-half the total thickness of the stator.

2. An alternator in accordance with claim 1, characterized in that each of the stacks constituting one tooth of the stator comprises a plurality of alternate laminations in which the lateral salient portions of greatest length are located on a same side of the tooth and in a direction opposite to that of the corresponding salient portions of the adjacent laminations.

References Cited

UNITED STATES PATENTS

| | | | |
|---|---|---|---|
| 385,386 | 7/1888 | Thomson | 310—42 |
| 2,501,222 | 3/1950 | Hybler | 310—42 |
| 2,519,919 | 8/1950 | Merrill | 310—156 |
| 2,802,959 | 8/1957 | Powers | 310—263 |
| 2,975,312 | 3/1961 | Ploran | 310—42 |
| 3,271,601 | 9/1966 | Raver | 310—68 |
| 3,321,652 | 5/1967 | Opel | 310—263 |
| 3,250,929 | 5/1966 | Maier | 310—68 |
| 3,346,749 | 10/1967 | Shafranek | 310—263 |
| 3,361,915 | 1/1968 | Baker | 310—68 |
| 2,256,870 | 9/1941 | Schaffer | 310—68 |
| 2,792,511 | 5/1957 | Horstman | 310—218 |
| 3,182,216 | 5/1965 | Bancroft | 310—218 |
| 3,295,046 | 12/1966 | Margaira | 310—68 |
| 3,296,472 | 1/1967 | Fisher | 310—187 |

MILTON O. HIRSHFIELD, Primary Examiner

M. O. BUDD, Assistant Examiner

U.S. Cl. X.R.

11—258; 310—218